Patented Oct. 10, 1950

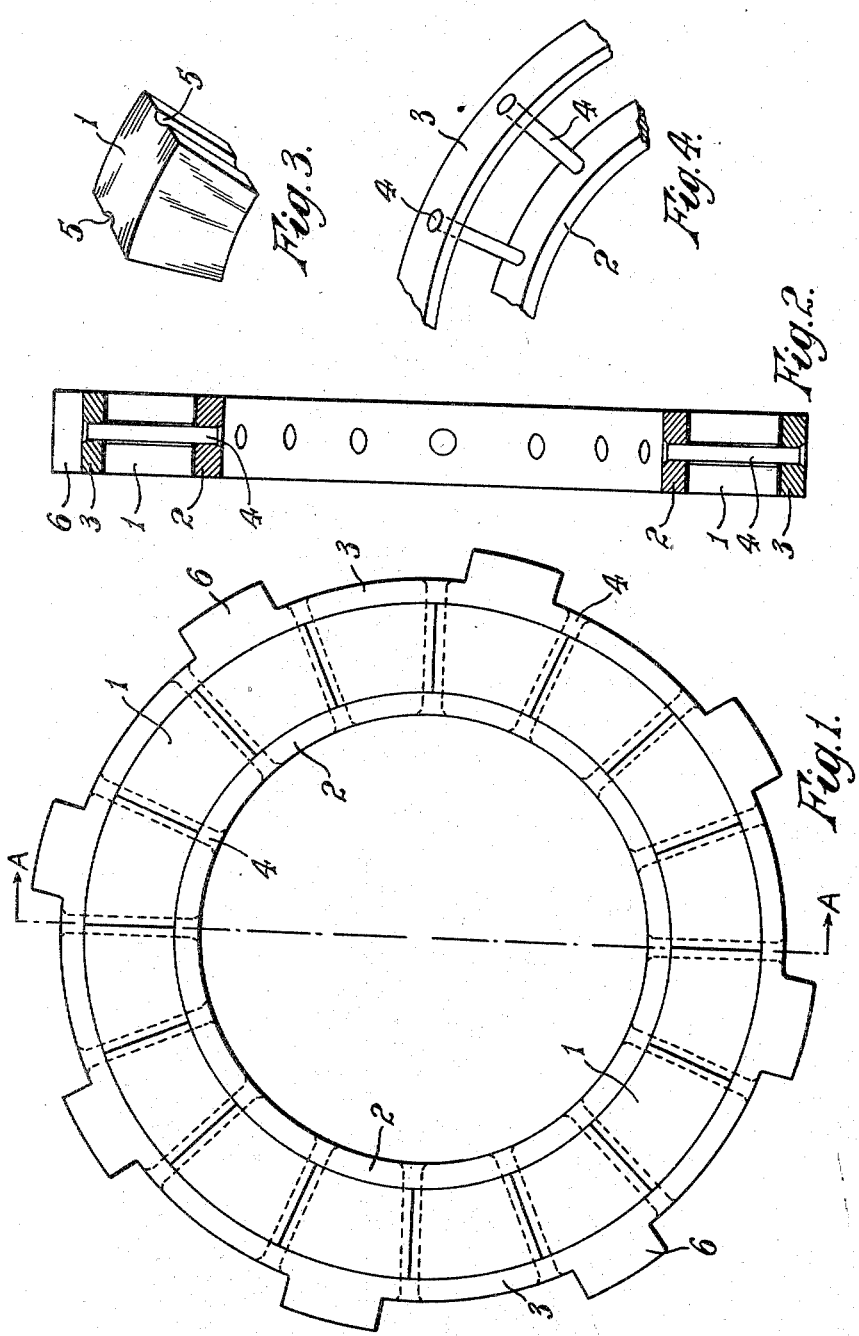

2,525,648

UNITED STATES PATENT OFFICE 2,525,648

BRAKE DISK

Henry James Butler, Sutton Coldfield, England, assignor to Dunlop Rubber Company Limited, London County, England, a British company Application December 4, 1948, Serial No. 63,560
In Great Britain January 6, 1948

4 Claims. (Cl. 188—218)

A serious defect of disc brakes, which is particularly evident in the case of disc brakes employed on modern aircraft of considerable weight and high landing speeds, is that the heat developed by friction during the braking operation is liable to cause distortion of the discs and thus render the brakes unreliable or even inoperative.

It is an object of this invention to provide improved brake discs which are less liable to become distorted during use than those at present known.

According to the invention a brake disc comprises a plurality of arcuate elements disposed circumferentially in a loose fit in side by side relationship between an inner and an outer retaining member and held against axial and circumferential displacement relative to said retaining members by means connecting said retaining members.

In order that the invention may be more fully described, reference is made to the accompanying drawings in which:

Figure 1 is a plan view of a brake disc constructed in accordance with the invention.

Figure 2 is a section of the same disc on the line A—A of Figure 1 looking in the direction of the arrows.

Figure 3 is a perspective view of an arcuate segment thereof.

Figure 4 is a perspective view of a portion of the disc omitting the arcuate segments.

In this embodiment of the invention a brake disc, Figures 1 and 2, comprises sixteen identical arcuate segments 1, Figure 3, each having a pair of radially extending faces subtending an angle of approximately 22½°. The segments are located between an inner annular retaining member 2 and an outer angular retaining member 3, the radially extending faces of adjacent segments fitting sufficiently loosely to allow of free circumferential expansion when the segment heats up during operation of the brake. Axial displacement of the segments is prevented by radially aligned rivets 4, Figure 4, which are located in recesses 5, Figure 3, formed in the abutting faces of the segments and which extend beyond the circumferential faces of the segments into holes formed in the annular members. Driving lugs 6 are provided at equally spaced intervals along the internal or external periphery of the brake discs, as the case may be, to engage with the complementary slots on the rotatable portion of the wheel assembly with which the disc is to be associated.

Having described my invention, what I claim is:

1. A brake disc comprising an inner retaining member, an outer retaining member co-axial with said inner retaining members, said outer member having a diameter sufficient to provide a space between said inner and outer members, a plurality of equally spaced radial rivets extending in a common plane from said inner members to said outer member and a plurality of arcuate friction elements between said inner and outer members and fitting between said rivets.

2. The brake disc of claim 1 wherein the abutting faces of adjacent friction elements are provided with radial recesses to receive said rivets.

3. A brake disc which comprises an inner ring, an outer ring concentric therewith and spaced therefrom to provide an annular space, brake blocks in said annular space and having abutting radial faces and spacing rivets extending radially in said annular space from said inner ring to said outer ring between the abutting faces of said brake blocks.

4. A brake disc comprising an inner annular member, an outer annular member concentric with and in substantially the same plane as said inner member, said members being of diameters to provide an annular space between them, spacing members extending radially at regular intervals between said inner and outer members and brake blocks fitting between the spaces of said spacing members and said brake blocks having abutting faces.

HENRY JAMES BUTLER.

REFERENCES CITED

The following references are of record in the file of this patent:

UNITED STATES PATENTS

| Number | Name | Date |
|---|---|---|
| 930,859 | Hook | Aug. 10, 1909 |
| 2,023,041 | Ballash | Dec. 3, 1935 |
| 2,190,767 | Benson | Feb. 20, 1940 |